(12) United States Patent
Rybski et al.

(10) Patent No.: US 9,941,028 B2
(45) Date of Patent: Apr. 10, 2018

(54) ELECTRICAL CONDUCTOR FOR AERONAUTICAL APPLICATIONS

(71) Applicant: NEXANS, Paris (FR)

(72) Inventors: Patrick Rybski, Yerres (FR); Sebastien Dablement, Oisy (FR)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/789,256

(22) Filed: Jul. 1, 2015

(65) Prior Publication Data

US 2016/0042832 A1 Feb. 11, 2016

(30) Foreign Application Priority Data

Aug. 6, 2014 (FR) ...................................... 14 57650

(51) Int. Cl.
| | | |
|---|---|---|
| *H01B 7/00* | (2006.01) | |
| *H01B 5/00* | (2006.01) | |
| *B60R 16/02* | (2006.01) | |
| *H01B 1/02* | (2006.01) | |

(52) U.S. Cl.
CPC ............ *H01B 5/002* (2013.01); *B60R 16/02* (2013.01); *H01B 1/023* (2013.01); *H01B 1/026* (2013.01); *H01B 7/0009* (2013.01)

(58) Field of Classification Search
CPC .... H01B 1/02; H01B 1/04; C22C 9/00; C22F 1/08
USPC ....... 174/128.1, 126.1, 110 R, 102 R, 120 R, 174/120 SR; 428/606; 148/432
See application file for complete search history.

(56) References Cited

U.S. PATENT DOCUMENTS

| | | | |
|---|---|---|---|
| 1,810,499 A | 6/1931 | Romp | |
| 3,339,012 A * | 8/1967 | Hutchins, Jr. ............ | H01B 7/14 174/128.1 |
| 5,106,701 A * | 4/1992 | Kurosaka .................. | C22F 1/08 148/432 |
| 7,528,319 B2 * | 5/2009 | Kondo .................... | H01B 3/441 174/36 |
| 8,017,869 B2 * | 9/2011 | Tsukamoto ............... | C22C 9/00 174/128.1 |
| 8,545,731 B2 * | 10/2013 | Kim ....................... | B82Y 10/00 174/250 |
| 2002/0066503 A1 * | 6/2002 | Matsui ..................... | C22F 1/08 148/432 |
| 2003/0037957 A1 * | 2/2003 | Ueno .................... | H01B 7/0009 174/128.1 |
| 2007/0187134 A1 * | 8/2007 | Detian ..................... | C22F 1/08 174/126.1 |
| 2007/0190881 A1 | 8/2007 | Shibaoka et al. | |
| 2007/0202349 A1 * | 8/2007 | Chen .................... | B32B 15/018 428/607 |
| 2009/0272560 A1 * | 11/2009 | Tokunaga .............. | H05K 3/106 174/126.1 |

(Continued)

FOREIGN PATENT DOCUMENTS

| | | |
|---|---|---|
| JP | S5060792 | 5/1975 |
| JP | S59205106 | 11/1984 |

OTHER PUBLICATIONS

Search Report dated 2015.

*Primary Examiner* — William H Mayo, III

(74) *Attorney, Agent, or Firm* — Sofer & Haroun, LLP

(57) ABSTRACT

An electrical conductor has at least one conducting strand made up at least of a layer of copper and of a layer of silvered copper alloy, in which the silver content by mass is between 0.1% and 0.5%.

7 Claims, 1 Drawing Sheet

(56) References Cited

U.S. PATENT DOCUMENTS

| | | | |
|---|---|---|---|
| 2010/0078194 A1* | 4/2010 | Bhatt | B82Y 30/00 174/110 SR |
| 2011/0247866 A1* | 10/2011 | Kim | B82Y 30/00 174/257 |
| 2012/0267141 A1* | 10/2012 | Kamiyama | B21C 37/047 174/102 R |
| 2012/0298403 A1* | 11/2012 | Johnson | D07B 1/02 174/130 |
| 2014/0311769 A1* | 10/2014 | In | C22C 5/06 174/126.2 |

* cited by examiner

ELECTRICAL CONDUCTOR FOR AERONAUTICAL APPLICATIONS

RELATED APPLICATION

This application claims the benefit of priority from French Patent Application No. 14 57650, filed on Aug. 6, 2014, the entirety of which is incorporated by reference.

BACKGROUND

Field of the Invention

The invention relates to an electrical conductor for aeronautical applications.

Description of Related Art

This type of conductor exists and has already been patented. Mention may for example be made of patent application U.S. 2010/0096162 A1, which relates to a lightweight aluminum/copper composite conductor.

Divided-core conductors are generally made up of several layers of elementary strands. The number of these layers, their makeup, their construction and the direction in which they are assembled, as well as the profile and diameter of each strand, are the key elements that determine the conducting cross section of the conductor.

Conductors for electric cables according to the invention, which are particularly well suited to aeronautical applications, have improved performance in terms of electrical conduction and mechanical strength, while still being lightweight.

OBJECTS AND SUMMARY

A subject of the invention is an electrical conductor having at least one conducting strand.

The main feature of a conductor according to the invention is that in comprises at least one strand made up at least of a layer of copper and of a layer of silvered copper alloy, in which the silver content by mass is between 0.1% and 0.5%. The content by mass represents the ratio between the mass or silver to the mass of silvered copper alloy. The specific contribution made by each strand consisting of a layer of copper, and of a layer of silvered copper alloy, of which the silver content by mass is between 0.1% and 0.5% is that it allows the conductor to have mechanical strength superior to that of a copper strand of equivalent cross section, without thereby degrading the electrical conductivity. The conductor may have either a single strand or several strands of such a composition. Said conductor may also comprise other conducting strands made of different compositions.

Advantageously, an electrical conductor according to the invention comprises at least one strand made from a material to be selected from copper, aluminum, a copper alloy and an aluminum alloy. The conductor is made by assembling several strands in order to reach the target conducting cross section. The strands of which the conductor is made up may have mutually identical cross sections or different cross sections.

For preference, an electrical conductor according to the invention comprises a peripheral layer of several conducting strands made up at least of a layer of copper and of a layer of silvered copper alloy, in which the silver content by mass is between 0.1% and 0.5%. This is because strands arranged at the periphery of the conductor and made up at least of a layer of copper and of a layer of silvered copper make it possible to minimize contact resistances resulting from the user joining connecting pieces.

For preference, an electrical conductor according to the invention comprises a central strand made of high-tenacity alloy, six intermediate strands surrounding said central strand and made of aluminum alloy, and twelve peripheral strands made up at least of a layer of copper and of a layer of silvered copper alloy of which the silver content by mass is between 0.1% and 0.5%. It is assumed that the peripheral strands surround the intermediate strands. For preference, each intermediate strand is in contact with the central strand and at least one peripheral strand.

Advantageously, the conducting strands are covered with a layer protecting them against corrosion. The mechanical stresses, variation in temperature, relative humidity and pressure, and insulating materials in fact mean that the conductors, and therefore the strands of which these conductors are made, need to be specially adapted toward risk of corrosion.

Advantageously, the protective layer is a layer of nickel.

For preference, the cross section of each conducting strand is between 0.15 mm$^2$ and 2 mm$_2$. This sizing of cross section is valid for all the strands of the conductor, whether these are positioned centrally or peripherally within said conductor.

For preference, the conducting strands are arranged together in such a way that the circular section of the said conductor is as circular as possible. This is because such a conductor is easy to handle. In addition, it behaves in bending in exactly the same way whatever the direction of bending. It can therefore more easily be deployed and then connected in order to make an electrical connection between various devices.

A second subject of the invention is an electric cable comprising at least one electrical conductor according to the invention. Such a cable may for example comprise at least one insulating polymer sheath and/or at least one other filamentary functional member of the optical fiber type.

BRIEF DESCRIPTION OF THE DRAWINGS

A detailed description of one preferred embodiment of an electrical conductor according to the invention is given hereinafter with reference to the single FIGURE.

The single FIGURE is a view in cross section of an electrical conductor according to the invention.

DETAILED DESCRIPTION

Figure 1:
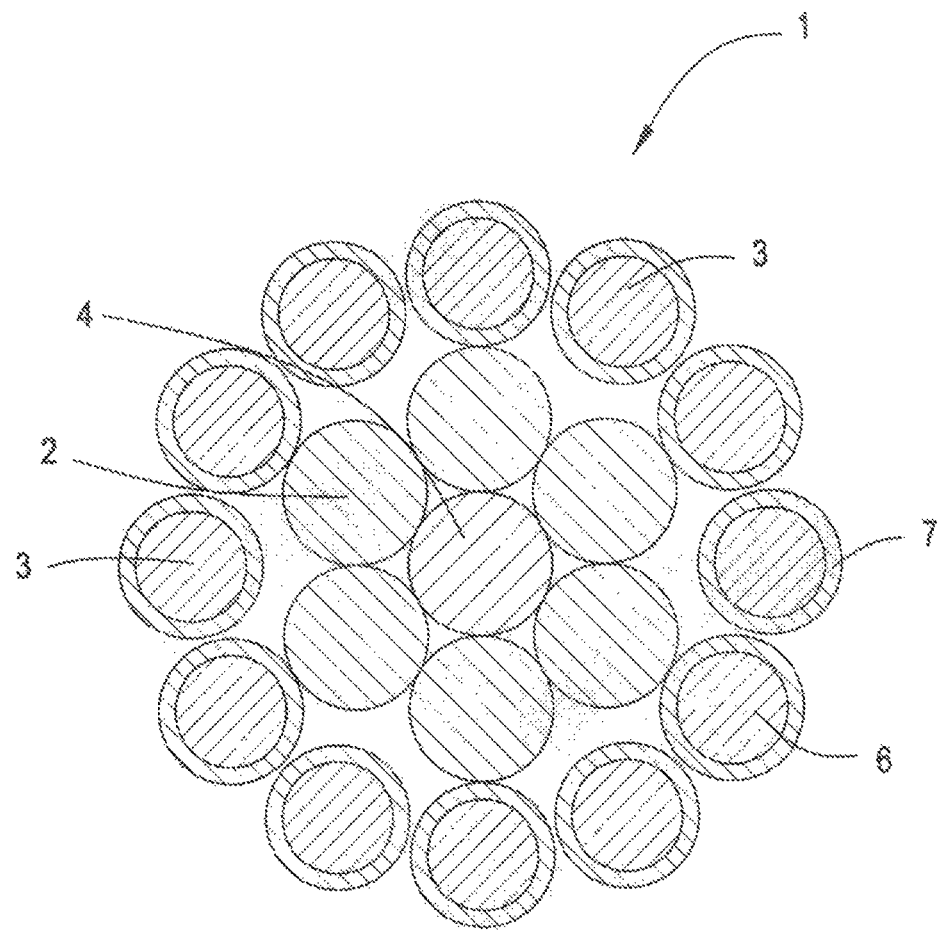

For this particular embodiment, a conductor 1 according to the invention comprises in total nineteen elementary strands 2, 3, 4. Each type of strand 2, 3, 4 is created beforehand and separately according to a metallurgical method specific to it.

With reference to the single figure, an electrical conductor 1 according to the invention comprises a central strand 4 made of high-tenacity copper alloy, six intermediate strands 2 made of aluminum and assembled around said central strand 4, and twelve peripheral strands 3 themselves made up of a layer of copper 6 and of a layer of silvered copper alloy 7 and which are assembled around said six intermediate strands 2. The silver content by mass of these peripheral strands 3 is between 0.1% and 0.5%.

All of these strands 2, 3, 4 are coated with a layer affording protection against corrosion, which is applied by electroplating. For preference, this protective layer is made of nickel.

The cohesion of these strands 2, 3, 4 on assembly is obtained by means of an assembly operation commonly referred to as stranding and which by twisting and with a preferential pitch length, allows the relative position of each strand 2, 3, 4 relative to the others to be maintained.

A geometric distribution of nineteen strands 2, 3, makes it possible to make the conductor 1 as cylindrical as possible.

By comparison with an existing conductor made from nineteen strands of copper alloy, a conductor 1 according to the invention offers the following features:

a mass per unit length that is reduced by 25%,
an equivalent strength per unit length,
the same outside diameter.

The invention claimed is:

1. Electrical conductor consisting of:
    at least one uninsulated conducting strand made up of a singular layer of copper and of another singular layer of silvered copper alloy thereover, in which the silver content by mass is between 0.1% and 0.5%,
    wherein said electrical conductor has an outermost peripheral layer of several conducting strands made up at least of a layer of copper and of a layer of silvered copper alloy, in which the silver content by mass is between 0.1% and 0.5%, and
    wherein said electrical conductor further has at least one internal strand made from a singular layer of material to be selected from the group consisting of copper, aluminum, a copper alloy and an aluminum alloy, said internal strand being surrounded by said outermost peripheral layer.

2. Electrical conductor according to claim 1, wherein said electrical conductor has a central strand made of high tenacity alloy, six intermediate strands surrounding said central strand and made of aluminum alloy, and twelve peripheral strands made up at least of a layer of copper and of a layer of silvered copper alloy of which silver content by mass is between 0.1-0.5%.

3. Electrical conductor according to claim 1, wherein the conducting strands are covered with a layer protecting them against corrosion.

4. Electrical conductor according to claim 3, wherein the protective layer is a layer of nickel.

5. Electrical conductor according to claim 1, wherein a cross section of each conducting strand is between 0.15 mm$^2$ and 2 mm$^2$.

6. Electrical conductor according to claim 1, wherein the conducting strands are arranged together in such a way that the circular section of the said conductor is circular.

7. Electric cable comprising at least one electrical conductor according to claim 1.

* * * * *